United States Patent [19]

Walterick, Jr. et al.

[11] Patent Number: 4,661,259

[45] Date of Patent: Apr. 28, 1987

[54] PROCESS FOR REDUCING THE CONTENT OF TRIHALOMETHANE COMPOUNDS AND PRECURSORS THEREOF IN INFLUENT WATER

[75] Inventors: Gerald C. Walterick, Jr., Levittown; Bruce K. Fillipo, Dublin, both of Pa.

[73] Assignee: Betz Laboratories, Inc., Trevose, Pa.

[21] Appl. No.: 761,640

[22] Filed: Aug. 1, 1985

[51] Int. Cl.$^4$ .............................................. C02F 1/28
[52] U.S. Cl. .................................. 210/666; 210/694; 210/728; 210/736; 210/908
[58] Field of Search ............... 210/666, 694, 714, 725, 210/727, 728, 730, 735, 736, 908

[56] References Cited

U.S. PATENT DOCUMENTS

| Re. 28,807 | 5/1976 | Panzer et al. | 210/736 |
|---|---|---|---|
| Re. 28,808 | 5/1976 | Panzer et al. | 210/736 |
| 3,252,899 | 5/1966 | Rice et al. | 210/666 |
| 3,288,770 | 11/1966 | Butler | 526/204 |
| 3,338,828 | 8/1967 | Clark | 210/730 |
| 3,423,312 | 1/1969 | Blaisdell et al. | 210/714 |
| 3,917,821 | 11/1975 | Manes | 724/125 |
| 4,043,904 | 8/1977 | Takeda et al. | 210/666 |
| 4,239,865 | 12/1980 | Tarao et al. | 210/688 |
| 4,274,968 | 6/1981 | Grutsch et al. | 210/666 |
| 4,314,906 | 2/1982 | Dunn et al. | 210/694 |
| 4,320,011 | 3/1982 | Sato et al. | 210/694 |
| 4,537,683 | 8/1985 | Isacoff et al. | 210/667 |

FOREIGN PATENT DOCUMENTS

| 3324425 | 1/1985 | Fed. Rep. of Germany | 210/727 |
|---|---|---|---|
| 53-20656 | 2/1978 | Japan | |

OTHER PUBLICATIONS

Chem. Abs. 87:90394c (1977).
Chem. Abs. 89:117244m (1978).
Chem. Abs. 94:157877e (1981).
Chem. Abs. 89:117260p (1978), see above Japanese reference.
"The Mechanism of Flocculation Processes in the Presence of Humic Substances", Narkis et al, Journal AWWA, Feb. 1975, pp. 101-108.
"Chlorination of Organics in Drinking Water", Stevens et al, Journal AWWA, Nov. 1976, pp. 615-620.
"Measurement of Trihalomethane & Precursor Concentration Changes", Stevens et al, Journal AWWA, Oct. 1977, pp. 546-554.
"The Occurence of Organohalides in Chlorinated Drinking Waters", Bellar et al, Journal AWWA, Dec. 1974, pp. 703-706.
"The Use of Chloramine for Reduction of Trihalomethanes & Disinfection of Drinking Water", Brodtmann et al, Journal AWWA, Jan. 1979, pp. 40-42.
"Coagulation & Color Problems", Joint Report, Journal AWWA, May 1970, pp. 311-314.
"Removing Color & Chloroform Precursors from Low Turbidity Waters by Direct Filtration", Scheuch et al, Journal AWWA, Sep. 1981, pp. 497-502.
Glaser et al., "Coagulation and Direct Filtration of Humic Substances with Polyethylenimine," *Env. Sci. & Tech*, Mar. 1979, pp. 299-305.

*Primary Examiner*—Peter Hruskoci
*Attorney, Agent, or Firm*—Alexander D. Ricci; Bruce E. Peacock; James D. Dee

[57] ABSTRACT

Methods for reducing the trihalomethane contents for precursor thereof of influent water are disclosed. The methods comprise adding to the influent water powdered activated carbon and a water soluble or water dispersible cationic polymer. The polymers are chosen from: (a) polyquaternary ammonium polymers formed from reaction of a secondary amine with an epichlorohydrin or epoxide (b) cross-linked polyquaternary ammonium polymers formed from reaction of a secondary amine, epichlorohydrin or epoxide, and a third reactant selected from the group consisting of ammonia, primary amines, alkylenediamines and polyamines and (c) substantially linear high molecular weight polyquaternary ammonium polymers of the type disclosed in U.S. Pat. No. 3,288,770, such as polydiallyldimethyl ammonium chloride.

3 Claims, No Drawings

PROCESS FOR REDUCING THE CONTENT OF TRIHALOMETHANE COMPOUNDS AND PRECURSORS THEREOF IN INFLUENT WATER

FIELD OF THE INVENTION

The present invention pertains to methods for reducing the content of trihalomethane compounds and precursors thereof in influent water for potable and/or industrial use.

BACKGROUND

Chlorine is commonly used in water treatment processes for a variety of reasons. It is a known disinfectant, may be used to remove ammonia and other nitrogenous organic compounds, and can also provide control over objectionable taste and odor. Chlorine addition also serves to reduce color, and to control slime and algae growth.

Chlorine can be provided in gaseous form or in liquid form. Commonly utilized compounds include hydroclorites of calcium and sodium, chloramines produced via reaction of chlorine and ammonia, chloride dioxide, and chlorine donor complexes such as chlorinated cyanurates.

Recent concern has arisen over the formation of trihalomethane (THM) species in portable and industrial waters due to the alleged carcinogenicity of these materials. Conventional wisdom attributes such THM formation to chlorination.

In addition to chloroform formation, other troublesome THM species, depending on initial water chemistry and treatment parameters, may include bromodichloromethane, dibromochloromethane, bromoform, iododichloromethane, diiodochloromethane and iodoform. These species are thought to form when THM precursor compounds such as ethanol, methyl ketone, humic acid, acetone, acetaldehyde, or acetophenone, are contacted with chlorine or other halogen.

Accordingly, the desirability of attaining effective methods to reduce the formation of THMs or precursor compounds is readily apparent.

SUMMARY OF THE INVENTION

I have found that conjoint use of powdered activated carbon (P.A.C.) and a cationic water soluble as dispersible polymer or polymers effectively reduces THM or precursor thereof concentration. In one particularly unique aspect of my invention, the powdered activated carbon is added to the desired system in slurry form with an effective polysaccharide suspending agent, such as, for instance a hydroxyethyl cellulose or carboxymethyl cellulose material.

PRIOR ART

In "Measurement of Trihalomethane and Precursor Concentration Changes," Stevens et al, Journal AWWA, page 546-54; October, 1977, it is stated that THM and precursor removal efficiencies vary widely with time in service of granular activated carbon filters.

Cationic polyelectrolyte in combination with sand filters and/or anthracite coal/sand filters for color and chloroform precursor removal in low turbidity water is disclosed in "Removing Color and Chloroform Precursors from Low Turbidity Waters by Direct Filtration," Scheuch et al, Journal AWWA, pages 497–502, September, 1981. One specific polyquaternary ammonium polymer formed via condensation reaction of dimethylamine and epichlorohydrin is disclosed in the article and is the same as the preferred polymer of Group I as specified later herein.

The use of PAC as a coagulant aid is well known. For instance, in U.S. Pat. No. 3,252,899 to Rice, et. al., the use of activated carbon and a polymeric flocculating agent such as polyacrylamide or hydrolyzed polyacrylamide is stated to remove organic pollutants from wastewater. Of similar import is U.S. Pat. No. 4,043,904 to Takeda, et. al., which teaches the use of polyacrylamide with PAC to cleanse wastewaters contaminated with polynuclear surface active agents.

Other prior art patents and literature references which may be of interest to the present application include: U.S. Pat. No. 4,239,865 (Tarao, et. al.); U.S. Pat. No. 4,320,011 (Sato, et. al.); Chem. Abstract 87:90394e (1977); Chem. Abstract 89:117244m (1978); Chem. Abstract 94:157877e (1981); and Chem. Abstract 89:117260p (1978).

Despite the efforts of the prior art, there remains a need for an economical THM or precursor reduction treatment method. The instant method, as it calls for the use of both P.A.C. and water soluble or dispersible cationic polymer, provides significantly enhanced results over the use of either of the components singly.

DETAILED DESCRIPTION OF THE INVENTION

In accordance with the invention, treatment comprising PAC and a water soluble or water dispersible cationic polyelectrolyte is utilized to reduce the THM or precursor thereof content of influent water. These components are preferably admitted to the influent, raw water at a location or locations upstream from a softening, clarification or filtration process.

The first component of the system is powered activated carbon. This is available commercially from a variety of sources.

The second component is a water soluble or dispersible cationic polyelectrolyte polymer or polymers chosen from the groupings (I), (II) (III) as hereinafter defined.

Polymers belonging to the first (I) grouping include water soluble or dispersible polyquaternary ammonium polymers of the type disclosed in U.S. Pat. No. Re. 28,807 (Panzer, et. al.). The entire disclosure of this reissue patent is hereby incorporated by reference herein.

As is stated in that reissue patent, the polyquaternary polymers of cationic polymer group (I) are derived from reaction of secondary amines, such as dialkylamines, and difunctional epoxide compounds or precursors thereof.

In accordance with the reissue patent disclosure, the water dispersible polyquaternary polymers, used as the second component in the present invention, consist essentially of the repeat units

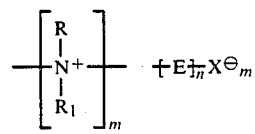

wherein R and $R_1$ are independently selected from the group consisting of lower alkyl (1–3 carbon atoms). E is the residue obtained after bifunctional reaction of a compound selected from the group consisting of epihalohydrins, diepoxides, precursors for epihalohydrins and diepoxides, and mixtures thereof. m and n are integers of substantially equal value. $X^\ominus$ represents the anion forming a portion of the polyquaternary compound. In summary, the polymers (group I) involve only two reactants: a lower dialkylamine, and a difunctional epoxy type reactant.

As to the epoxy reactant, epihalohydrins, such as epichlorohydrin and epibromohydrin may be mentioned. Epichlorohydrin is preferred. Diepoxides such as 1,4-butanediol-diglycidyl ethers are also useful. Precursors for epihalohydrins and diepoxides are also useful. Exemplary precursors include: 1,3-dichloropropanol-2 and 1,4-dichloro-2,3-dihydroxybutane.

As to the secondary amines which may be used as reactants, these include dimethylamine, diethylamine, dipropylamine, and secondary amines containing mixtures of alkyl groups having 1 to 3 carbon atoms.

Exact reaction parameters may be gleaned from perusal of aforementioned U.S. Pat. No. Re. 28,807 and need not be repeated here. Suffice it here to say that the preferred polymer of group I is formed from dimethylamine and epichlorohydrin reaction. Such reaction is detailed in Example 1 of the reissue patent.

The preferred polyquaternary polymer of group I is thought to have the structure:

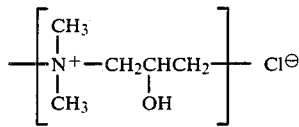

The molecular weight of this polymer is approximately 10,000. The particular molecular weight is not critical as long as the polymer remains water soluble or water dispersible.

As to the group (II) cationic polymers which may be used in accordance with the invention, these may be generically characterized as cross-linked polyquaternary ammonium polymers and are described in detail in U.S. Pat. No. Re. 28,808 (Panzer, et. al.). The entire disclosure of this reissue patent is hereby incorporated by reference herein.

As is stated in the 28,808 reissue patent, the water dispersible polyquaternary polymer consists essentially of repeating units.

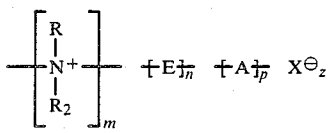

wherein R, $R_2$, E, m, and n are the same as given above for the polymer (I) grouping.

A is the residue obtained after bifunctional reaction of a polyfunctional polyamine selected from the group consisting of ammonia, primary amines, alkylene diamines of 2 to 6 carbon atoms, polyalkylpolyamines of the structure

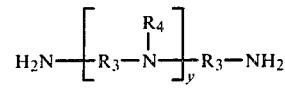

wherein y represents an integer of about 1 to 5, $R_3$ is an alkylene radical of about 2 to 6 carbon atoms, and $R_4$ is selected from the group consisting of hydrogen, alkyl of about 1 to 3 carbon atoms, and $\omega$-aminoalkyls of about 2 to 6 carbon atoms, a polyglycolamine of a structure such as

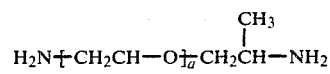

wherein a is an integer of about 1 to 5, piperazine heteroaromatic diamines of the structure

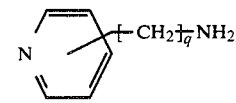

wherein q is zero or an integer of about 1 to 3, aromatic diamines of the structure

wherein q is zero or an integer of about 1 to 3, and polyamine-polybasic acid condensation products of molecular weight up to about 10,000; $X^-$ is an ion forming the anionic portion of said polyquaternary compound; m and p are integers which represent molar quantities of amine reactants, the ratio of m to p being from about 99:1 to 85:15; n represents the molar quantity of E forming the principal chain of said polyquaternary, the molar quantity represented by n being substantially equal to the sum of the molar quantities of m and p; said polyfunctional amine containing in addition to the amount of E required for difunctional reaction therewith an amount of E which is from zero to about the full functional equivalency remaining in said A; the sum of m, n and p being such as to provide a polyquaternary compound which as a 37% aqueous solution, by weight, based on the total weight of the cationic portion of said polyquaternary has a viscosity at 25° C. of at least =100 centistokes and Z is an integer such as to satisfy anion requirements of the polyquaternary compound.

In summary, the group II polymers are formed from three reactants: a lower dialkylamine ($C_1$–$C_3$), a difunctional epoxy type reactant (the same as in the Group I polymers) and a third reactant selected from the group consisting of ammonia, primary amines, alkylenediamines of from 2–6 carbon atoms, and polyamines as defined hereinabove for A.

Exact reaction parameters for the group II cationic polyelectrolytes are specified in aforementioned U.S. Pat. No. Re. 28,808 and need not be repeated here. The preferred group II polymer is a cross-linked polyquaternary polymer formed from ethylenediamine, dimethylamine and epichlorohydrin (see for instance Example 2 of U.S. Pat. No. Re. 28,808).

The preferred group II polymer is thought to have the structure:

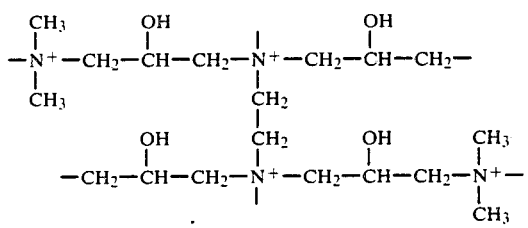

The molecular weight $\overline{M}n$ of this polymer is $400–600 \times 10^3$.

Cationic polymers of Group III are disclosed in U.S. Pat. No. 3,288,770 (Butler). The entire disclosure of this '770 patent is hereby incorporated by reference herein.

To paraphrase the '770 patent, these particular high molecular weight polyquaternary polymers are characterized as having a linear homopolymer chain of repeat units having one of the formulae:

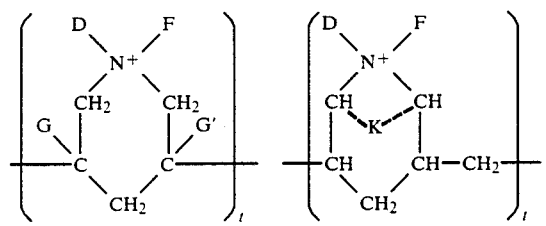

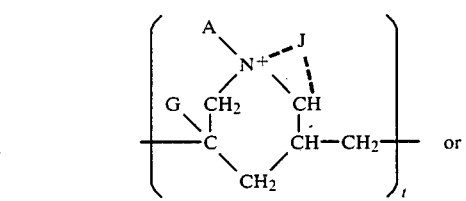

or

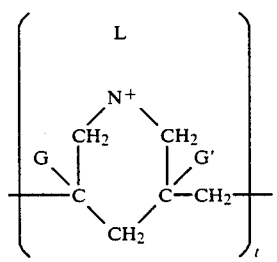

It will be appreciated that, with each such cationic ammonium group, there is associated a chloride anion.

In the above formulae, the symbols D and F independently represent an alkyl, hydroxyalkyl, or phenyl radical which may contain as substituents such groupings as amido, carboloweralkoxy, loweralkoxy, mono and dicyclic aryloxy, cyano, thioloweralkoxy, thiophenoxy, or lower alkoyl (forming a ketonic group) radicals, 5- and 6-membered cycloalkyl groupings, and, on the alkyl groupings only, a nitro group, and on the phenyl radical only, a halogen atom (chlorine, bromine, fluorine, and iodine).

The symbols G and G' independently represent a hydrogen, chloro, bromo, or lower alkyl or phenyl radical, having substitutents as stated under the definition for D and F above.

The symbol K stands for a divalent radical of the formula:

$$-CH_2-(O)_s-(CH_2)_u$$

The symbol J stands for a divalent radical of the formula:

$$-(CH_2)_w-(O)_s-CH_2-$$

The symbol L stands for a divalent radical of the formula:

$$-(CH_2)_w-(O)_s-(CH_2)_2$$

In these last-mentioned formulae, the small letter s represents one of the numbers 0 and 1; the small letter u represents one of the numbers 1 and 2; and the small letter w represents one of the numbers 2 and 3. See Col. 2 & 3 U.S. Pat. No. 3,288,770

After the issuance of the '770 patent, the following formula has been reported as being characteristic of the preferred polymer of group III, namely polydiallyl-dimethyl ammonium chloride (DADMAC):

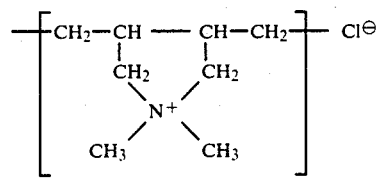

This preferred polymer of Group III has been reported to have a molecular weight ($\overline{M}n$) of between about $250–400 \times 10^3$. It is noted that the molecular weight of this third component (as well as for the polymers of groups I and II) is not critical as long as the polymer remains water soluble or water dispersible.

Methods for producing the polymers of the Group III grouping of the invention need not be reported in detail herein, as they are reported in the aforementioned U.S. Pat. No. 3,288,770. The preferred DADMAC polymer of Group III, for instance, may be prepared in accordance with the disclosure of Example 1 of said '770 patent.

The amounts of the treatment components to be fed to the system will vary in accordance with such factors such as: amount of THM or precursors present in the influent water, water pH, and temperature.

The following treatment ranges, given in terms of ppm (based upon one million parts water) are contemplated:

Component One—P.A.C.—1 ppm to 5,000 ppm, with a range of 5 ppm–200 ppm being preferred;

Component Two—a water soluble or dispersible cationic polyelectrolyte chosen from the above groupings (I) (II) or (III)—based upon 100% actives polymer—0.1–2,500 ppm. It is noted that mixtures of polymers from the groupings (I) (II) and (III) are also within the purview of the invention. A range of from about 1–1,250 ppm of the cationic polymer is preferred.

It is presently preferred to admit the P.A.C. component to the desired influent water in the form of a slurry comprising an effective suspending agent. Presently, polysaccharide materials appear to optimize slurry stability and viscosity. Preferably the slurry is prepared so as to have an initial viscosity of between about 2,500–4,000 cps Brookfield RVT. The slurry should be capable of being stored at ambient temperature for about 6 months without substantial phase separation.

The preferred suspending agents are the cellulosic ethers, with hydroxyethyl cellulose and carboxymethyl cellulose being most preferred. The slurry will comprise from about 1–50 wt % P.A.C., about 0.025–5.00 wt % cellulose ether and remainder water. The slurry should preferably have a viscosity of about 2,500–4,000 cps Brookfield RVT.

At present, the P.A.C. containing slurry preferred for use comprises (based on the total slurry weight)
  0.5% sodium carboxymethyl cellulose suspending agent (commercially available from Hercules, Inc.)
  30.0% P.A.C.
  Remainder in water This preferred composition is capable of being stored at ambient temperature for about six months without substantial phase separation. After lengthy storage, the viscosity of the slurry may increase to within about 20,000–100,000 cps, but this viscosity is readily reduced by application of appropriate shear force.

Another polysaccharide which was tried as the suspending agent was dextran. This particular suspending agent exhibited some efficacy although the cellulosic ethers performed much better and are therefore preferred for use.

Quite surprisingly, other well known suspending agents such as polyvinylalcohol and certain polyethylene glycol ester products did not function adequately to suspend the P.A.C. in the slurry. When these particular materials were used, unacceptable phase separation occurred within a few hours.

I have found, at present, that optimal THM as precursor reduction is achieved whent the P.A.C. slurry and a combination of water soluble or dispersible cationic polymers is used. Specifically, the polymers which are presently preferred are:

Group I Polymer—polyquaternary ammonium polymer formed via condensation reaction of dimethylamine and epichlorohydrin thought to have structure

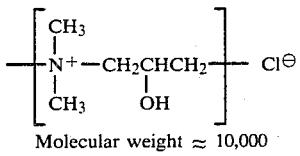

Molecular weight ≈ 10,000

Group III Polymer—polydiallydimethylammonium chloride (DADMAC) $\bar{M}n \approx 250-400 \times 10^3$.

The presently preferred ppm addition range for P.A.C. and both of the preferred polymers is shown in the Table in the Examples.

EXAMPLES

In order to demonstrate the efficacy of the invention in reducing trihalomethane (THM) content in influent water, THM reduction tests were conducted using Florida well water samples. The procedure used was a basic jar test in which the beakers were mixed simultaneously by a gang stirrer. The results appear in the following table.

Jar Test Procedure:
1. 500 mL of Florida well water added to each 600 mL beaker;
2. each filled beaker mixed at 100 rpm using a stirrer equipped with a 1×3″ paddle;
3. treatment added at indicated dosages; mixed 30 minutes at 100 rpm;
4. mixing speed reduced to 40 rpm, mixed 7 minutes at 40 rpm;
5. mixing stopped, samples allowed to settle for 10 minutes.

Procedure for Handling Samples for THM Analysis:
1. sample of each supernatant water treated with excess chlorine to promote formation of trihalomethanes;
2. sample bottles filled and sealed so that no air is entrapped;
3. supernatant water+chlorine allowed to react for 96 hours at ambient temperature;
4. each sample treated with sodium thiosulfate to stop reaction with chlorine;
5. samples refrigerated until analyzed;
6. samples analyzed by purge and trap gas chromatography method to determine THM content.

TABLE

| | Trihalomethane Removal | | | |
|---|---|---|---|---|
| | Treatment Dosages | | | |
| Treatment Added | PAC (ppm) | Polymer "A" (ppm) | Polymer "B" (ppm) | Supernatant THM (ppm CHCl$_3$) |
| None | — | — | — | 1.10 |
| PAC + Polymer "A" + Polymer "B" | 90 | 8.1 | 1.2 | 0.65 |
| PAC | 90 | — | — | 0.84 |
| Polymer "A" + Polymer "B" | — | 8.1 | 1.2 | 0.86 |

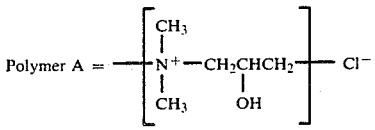

Molecular weight ≈ 10,000
Formed from dimethylamine and epichlorhydrin and condensation reaction, a Group I copolymer.
Polymer B = polydiallyldimethyl ammonium chloride

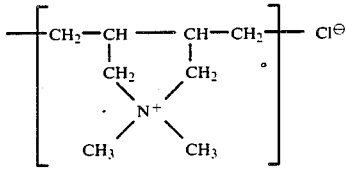

Mn ≈ 250 – 400 × 10$^3$
A Group III Polymer
PAC = Dispersion of powdered activated carbon in slurry with sodium carboxymethyl cellulose being used as a suspending agent.

The test results indicate that THM precursors are removed by treatment with a P.A.C. dispersion plus a blend of polymers A and B (Group I and III polymers specifically). The combination of PAC and polymers A & B shows enhanced treatment capabilities.

In accordance with the patent statutes, the best mode of practicing the invention has been herein set forth. However, it will be apparent to those skilled in the art that many modifications can be made in the methods and compositions herein disclosed without departing from the spirit of the invention. It is to be understood that the scope of the invention is to be limited solely by the scope of the appended claims:

I claim:

1. Method for reducing the content of trihalomethane compounds or precursors thereof in influent water, comprising adding to said water, based upon one million parts water,
   a. from about 1-5,000 ppm of powdered activated carbon,
   b. and a combination of at least two water soluble or water dispersible cationic polymers, one of said polymers being formed from reaction of dimethylene and epichlorohydrin and being added in an amount of about 8 ppm, the second cationic polymer being polydiallyldimethyl ammonium chloride having a molecular weight of about $250-400 \times 10^3$, and being added in an amount of about 1 ppm,
   c. mixing said influent water with said activated carbon and said cationic polymers to form a mixture, and
   d. separating said mixture to form a supernatant having a reduced trihalomethane content.

2. In a method of treating influent water to reduce the content of trihalomethane compounds or precursors thereof, wherein said water is caused to travel from an upstream direction to a downstream direction and is subjected to softening, clarification or filtration processes, the improvement comprising adding to said water, at a location or locations upstream from said softening, clarification or filtration processes, from about 1 to about 5,000 ppm of powdered activated carbon and a combination of at least two water soluble or water dispersible cationic polymers, one of said polymers being formed from reaction of dimethylamine and epichlorohydrin and being added in an amount of about 8 ppm, the second cationic polymer being polydiallyldimethyl ammonium chloride having a molecular weight of about $250-400 \times 10^3$, and being added in an amount of about 1 ppm, mixing said influent water with said activated carbon and said cationic polymers to form a mixture and separating said mixture to form a supernatant having a reduced trihalomethane content.

3. Method of reducing the trihalomethane compound or precursor thereof content of influent water comprising:
   a. making a slurry of powdered activated carbon by adding an effective suspending agent and said powdered activated carbon to water, the relative weight percent of components of said slurry based on the total slurry weight being from about 1-50 wt % powdered activated carbon, about 0.025-about 5.0 wt % suspending agent, remainder water, the viscosity of said slurry being from about 2,500-4,000 cps Brookfield RVT,
   b. adding said slurry to said influent water in an amount sufficient to provide from about 1-5,000 ppm of said powdered activated carbon in said influent water, based upon one million parts of said influent water, and
   c. also adding a combination of at least two water soluble or water dispersant cationic polymers to said influent water, one of said polymers being formed from reaction of dimethylamine and epichlorohydrin and being added in an amount of about 8 ppm, the second cationic polymer being polydiallyldimethyl ammonium chloride having a molecular weight of about $250-400 \times 10^3$, and being added in an amount of about 1 ppm,
   d. mixing said influent water with said activated carbon and said cationic polymer to form a mixture and separating said mixture to form a supernatant having a reduced trihalomethane content.

* * * * *

UNITED STATES PATENT AND TRADEMARK OFFICE
CERTIFICATE OF CORRECTION

PATENT NO. : 4,661,259
DATED : April 28, 1987
INVENTOR(S) : Gerald C. Walterick, Jr. et al It is certified that error appears in the above-identified patent and that said Letters Patent is hereby corrected as shown below:

On the title page

In the Abstract, line 1, change "contents for" to --- content of ---.

Column 1, line 46, change "as" to --- or ---.

Column 2, line 36, change "powered" to --- powdered ---.

Column 7, line 38, change "whent" to --- when ---.

Claim 1, line 9 and 10, change "dimethylene" to --- dimethylamine ---.

Claim 3, line 19, change "dispersant" to --- dispersible ---.

Signed and Sealed this

Eighth Day of December, 1987

Attest:

DONALD J. QUIGG

Attesting Officer

Commissioner of Patents and Trademarks